(No Model.) 2 Sheets—Sheet 1.
D. W. WILLIAMS.
SAWING AND CHANNELING MACHINE.
No. 270,532. Patented Jan. 9, 1883.
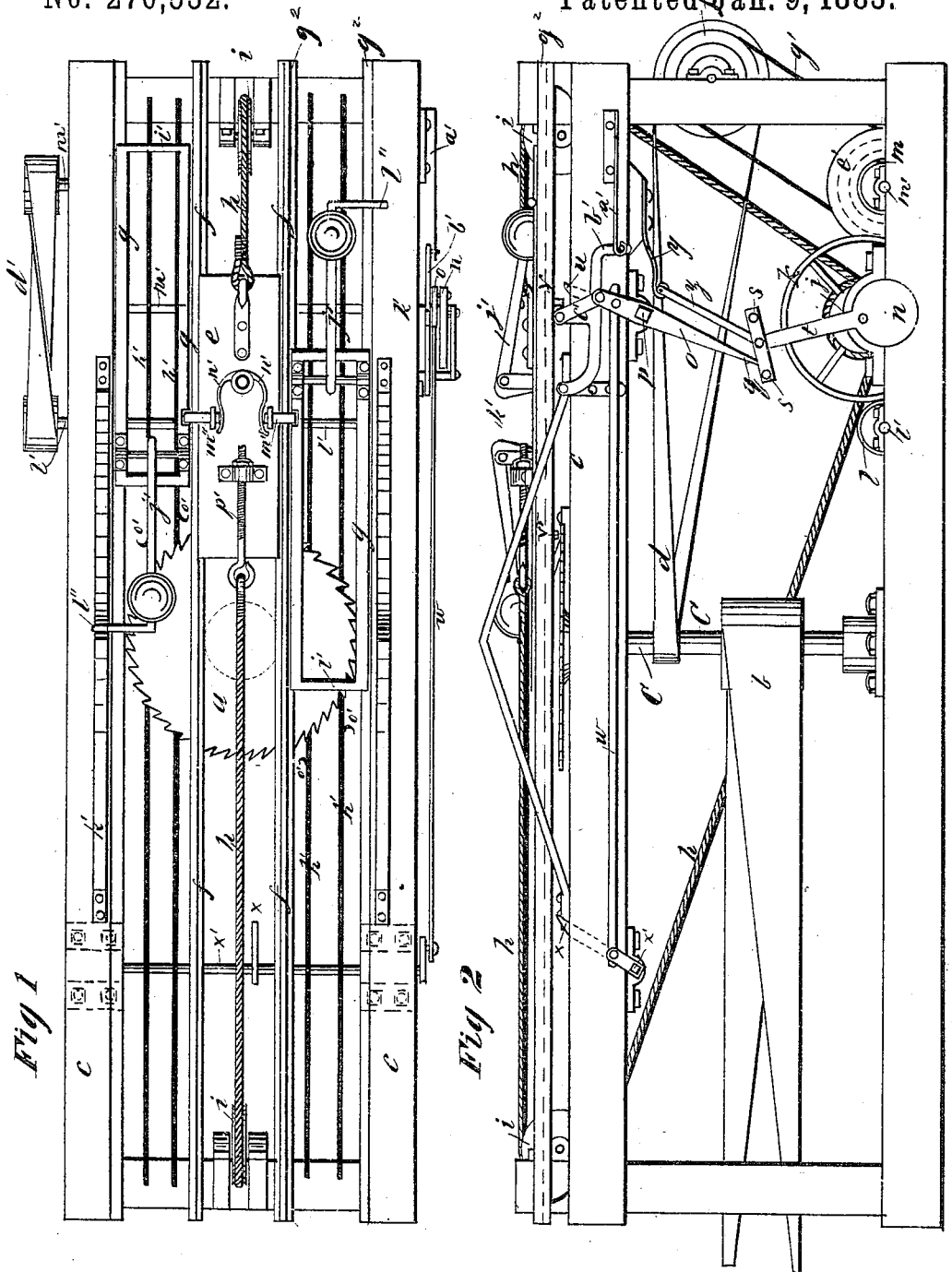
WITNESSES:
Chas. T. Howell,
C. Sedgwick
INVENTOR:
D. W. Williams
BY Munn & Co.
ATTORNEYS.

(No Model.) 2 Sheets—Sheet 2.
D. W. WILLIAMS.
SAWING AND CHANNELING MACHINE.
No. 270,532. Patented Jan. 9, 1883.
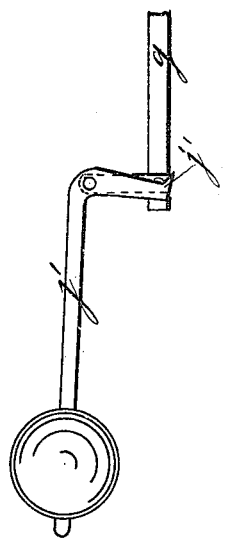
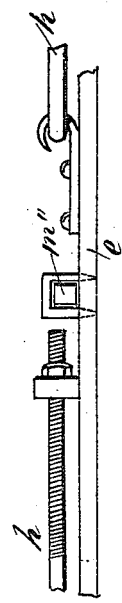
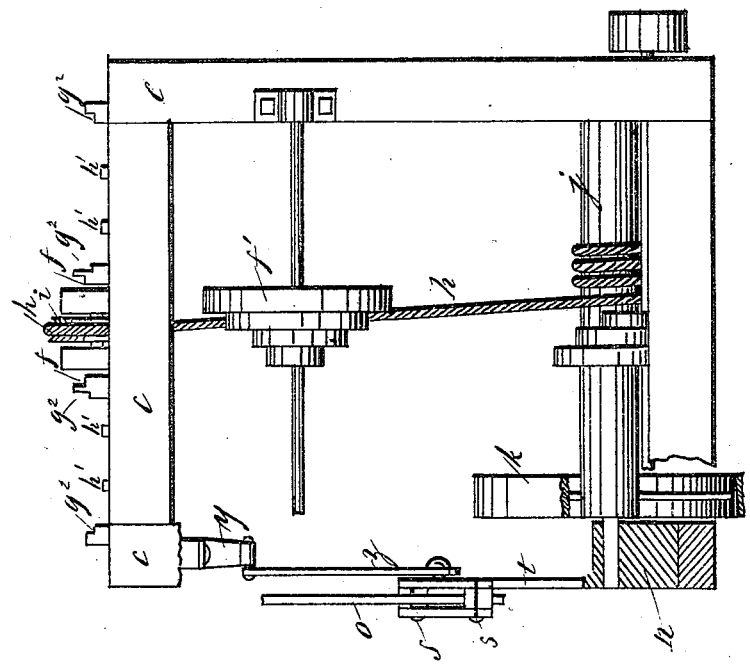
WITNESSES:
Chas. T. Howell,
C. Sedgwick
INVENTOR:
D. W. Williams
BY Munn & Co.
ATTORNEYS.

UNITED STATES PATENT OFFICE.

DANIEL W. WILLIAMS, OF SPRINGVILLE, CALIFORNIA.

SAWING AND CHANNELING MACHINE.

SPECIFICATION forming part of Letters Patent No. 270,532, dated January 9, 1883.

Application filed September 7, 1882. (No model.)

*To all whom it may concern:*

Be it known that I, DANIEL W. WILLIAMS, of Springville, in the county of Humboldt and State of California, have invented a new and Improved Sawing and Channeling Machine, of which the following is a full, clear, and exact description.

My invention consists of improvements in sawing and channeling machines for making roof-boards, sometimes called "shakes," the said improvements consisting essentially of automatic feeding, reversing, and setting gear, whereby two bolts may be applied to the saw at one and the same time, one being fed up to the saw while the other is being run back for resetting, all as hereinafter fully described.

Reference is to be had to the accompanying drawings, forming part of this specification, in which similar letters of reference indicate corresponding parts in all the figures.

Figure 1 is a plan view of my improved machine. Fig. 2 is a side elevation. Fig. 3 is partly an end elevation and partly a transverse section, and Figs. 4 and 5 are details.

The circular saw $a$ is mounted on the upper end of the vertical arbor C a little above the top of the frame $c$. The arbor is driven by a belt, $b$, and it drives a feed-belt, $d$, for working a carrier, $e$, forward and backward in the ways $f$ along the saw, for the purpose of operating the two bolt-carriages $g$ in the ways $g^2$, by which the bolts to be sawed are to be automatically set and fed to the saw, one being fed up while the other is being drawn back for resetting.

For operating the carrier it has the two ends of a cord or belt, $h$, attached to it, said cord being extended each way from it along between the ways $f$, and passing over the guide-pulleys $i$ at the ends of said ways to a drum, $j$, below, whereon it is coiled so that it will be wound on and off in either direction and according to the way the drum is turned. This drum has a friction-wheel, $k$, on it, working between the two reversely-turning friction feed-wheels $l$ $m$, and the end of said drum next to said feed-wheels is mounted in an eccentric bearing, $n$, for the purpose of being shifted from one to the other of said wheels to be turned forward and backward to effect the traverse movement of the carrier.

To shift the eccentric automatically and reverse the motion of the carrier, a tripper, $o$, is pivoted to the frame at $p$, and arranged with its end $q$ to vibrate against the pins $s$ of the arm $t$ of the eccentric to swing said eccentric at the proper time, the said tripper being connected with an arm, $u$, of a shaft, $u'$, which is shifted to the right hand by a stud, $v$, on the under side of the carriage, which strikes said arm when the carrier arrives at the end of its range in that direction, and said tripper is connected by rod $w$ with the shaft $x'$ of an arm, $x$, at the other end of the range of the carrier, which is shifted to the left hand by a stud, $v'$, when the carrier arrives thereat. The spring $y$ and connecting-rod $z$ hold the friction-wheel $k$ on the respective feed-wheels $l$ or $m$ to cause the necessary friction for effecting the traverse of the carrier, and the spring $a'$, lever $b'$, and connecting-rod $c'$ hold the tripping-arms $u$ and $x$ in their respective positions after being shifted.

The shafts $l'$ and $m'$ of the feed-rollers $l$ and $m$ are connected by crossed belt $d'$, and operated by the cone-pulleys $e'$ and $f'$ and belt $g'$, the cone-pulley $f'$ being driven by the aforesaid feed-belt $d$, driven by the saw-arbor.

The bolts to be sawed are placed in the carriages on the rails $h'$, between the end bars, $i'$, and the elbow-lever and weighted dogs $j'$, to be held as they are fed to the saw. They are automatically fed down as each board is cut, and discharged by the raising of the arms $l''$ of the weighted dog on the inclines $k'$, when the carriages return to the starting-point, which allows the bolts to fall on the rails $h'$. The dogs engage the bolts again, when the carriages go forward to the saw. The carriages are connected with the carrier $e$ by the sliding stops $m''$ and spring $n'$, so contrived that the attendant may readily detach and stop one for removing the "spaul" and putting in a new bolt while the carrier continues to run and work the other carriage.

I propose to attach gouges $o'$ to the frame, suitably in advance of the saw, and in such relation to the rails $h'$ that the bolts will be grooved or channeled on the under side at the same time that the shakes or boards are sawed off, as the roofing-boards are required to be.

The cord $h$ is adjustably connected to the carrier by a screw, $p'$, for tightening it when required.

Having thus described my invention, what I claim as new, and desire to secure by Letters Patent, is—

1. The combination, with the carrier-belt $h$, guide-pulleys $i$, and drum $j$, of the friction-wheels $k\ l\ m$, the spring $y$, the rod $z$, and the eccentric bearing $n$, whereby the traverse movement of the carrier is effected, as described.

2. The combination, with the eccentric bearing $n$, having the pin-arm $s\ t$, of the pivoted tripper $o$, the tripping-arms $u\ x$, the shafts $w'\ x'$, connected with the tripper, and a carriage having the studs $v\ v'$, whereby the eccentric may be automatically shifted to reverse the motion of the carrier, as described.

3. The combination, with the carriages and carrier $e$, of the stops $m''$ and spring $n'$, arranged to operate as and for the purpose specified.

DANIEL W. WILLIAMS.

Witnesses:
MATHEW PERROTT,
LEMUEL CHURCH.